United States Patent
Schillace et al.

(10) Patent No.: US 12,499,314 B2
(45) Date of Patent: Dec. 16, 2025

(54) MULTI-DIMENSIONAL ENTITY GENERATION FROM NATURAL LANGUAGE INPUT

(71) Applicant: Microsoft Technology Licensing, LLC, Redmond, WA (US)

(72) Inventors: Samuel Edward Schillace, Portola Valley, CA (US); Umesh Madan, Bellevue, WA (US); Devis Lucato, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 18/129,697

(22) Filed: Mar. 31, 2023

(65) Prior Publication Data

US 2024/0202451 A1 Jun. 20, 2024

Related U.S. Application Data

(60) Provisional application No. 63/442,034, filed on Jan. 30, 2023, provisional application No. 63/433,627, filed on Dec. 19, 2022, provisional application No. 63/433,619, filed on Dec. 19, 2022.

(51) Int. Cl.
*G06F 40/30* (2020.01)
*G06F 30/12* (2020.01)
*G06F 40/186* (2020.01)

(52) U.S. Cl.
CPC .............. *G06F 40/30* (2020.01); *G06F 30/12* (2020.01); *G06F 40/186* (2020.01)

(58) Field of Classification Search
None
See application file for complete search history.

(56) References Cited

U.S. PATENT DOCUMENTS

| | | |
|---|---|---|
| 10,171,656 B2 | 1/2019 | Pullamplavil |
| 10,950,231 B1 | 3/2021 | Kockerbeck |
| 11,017,780 B2 | 5/2021 | Steelberg |
| 11,095,468 B1 | 8/2021 | Pandey et al. |
| 11,106,736 B1 | 8/2021 | Newman |
| 11,328,368 B1 | 5/2022 | Labrie |
| 11,443,164 B2 | 9/2022 | Dalli |
| 11,573,993 B2 | 2/2023 | Nelson et al. |
| 11,605,387 B1 | 3/2023 | Muralitharan |

(Continued)

OTHER PUBLICATIONS

Notice of Allowability mailed on Dec. 4, 2024, in U.S. Appl. No. 18/129,758, 5 pages.

(Continued)

*Primary Examiner* — Quynh H Nguyen

(57) ABSTRACT

Aspects of the present disclosure relate to systems and methods for creating a multi-dimensional entity (MDE) based on natural language (NL) input. A user may provide NL input into an application. One or more skills may be identified for the NL input, each of which has an associated prompt template. For example, a skill is associated with a computer-aided design and/or three-dimensional manufacturing application and/or file format, thereby enabling the generation of output associated with such applications and/or file formats. In examples, a skill chain may be generated that includes one or more skills with which to generate MDE output accordingly.

20 Claims, 9 Drawing Sheets

(56) References Cited

U.S. PATENT DOCUMENTS

| | | |
|---|---|---|
| 11,823,477 B1 | 11/2023 | Ramezani |
| 2003/0115548 A1 | 6/2003 | Melgar |
| 2014/0040262 A1 | 2/2014 | Winter |
| 2016/0070911 A1 | 3/2016 | Okereke |
| 2017/0212886 A1 | 7/2017 | Sarikaya et al. |
| 2018/0060334 A1 | 3/2018 | Jensen |
| 2018/0151081 A1 | 5/2018 | Chen |
| 2019/0028520 A1 | 1/2019 | Nawrocki |
| 2019/0384813 A1 | 12/2019 | Mohamed |
| 2020/0031112 A1 | 1/2020 | Noterman |
| 2020/0133071 A1 | 4/2020 | Dai |
| 2020/0311122 A1 | 10/2020 | Ramamurthy |
| 2020/0311162 A1 | 10/2020 | Xu et al. |
| 2020/0403817 A1 | 12/2020 | Daredia et al. |
| 2021/0109769 A1 | 4/2021 | Chenguang |
| 2021/0117479 A1 | 4/2021 | Liu |
| 2021/0182341 A1 | 6/2021 | Mullins |
| 2021/0224336 A1 | 7/2021 | Bright |
| 2021/0271707 A1 | 9/2021 | Lin |
| 2021/0303638 A1 | 9/2021 | Zhong et al. |
| 2021/0342711 A1 | 11/2021 | Mokeev et al. |
| 2022/0100831 A1 | 3/2022 | Moreno |
| 2022/0101861 A1 | 3/2022 | Antos |
| 2022/0198156 A1* | 6/2022 | Rao .................... G06N 20/00 |
| 2022/0199079 A1 | 6/2022 | Hanson |
| 2022/0200934 A1 | 6/2022 | Dutta |
| 2022/0342900 A1 | 10/2022 | Basu |
| 2022/0358713 A1 | 11/2022 | Krishnamurthy |
| 2022/0385758 A1 | 12/2022 | Tadesse et al. |
| 2023/0035076 A1 | 2/2023 | Wang |
| 2023/0111517 A1 | 4/2023 | Anderson |
| 2023/0115420 A1 | 4/2023 | Dabas |
| 2023/0135179 A1 | 5/2023 | Mielke |
| 2023/0139347 A1 | 5/2023 | Bondarenko |
| 2023/0142718 A1 | 5/2023 | Asgekar |
| 2023/0153641 A1 | 5/2023 | Manda et al. |
| 2023/0153700 A1 | 5/2023 | Lindgren |
| 2023/0155903 A1 | 5/2023 | Song |
| 2023/0386469 A1 | 11/2023 | Horton |
| 2024/0078376 A1 | 3/2024 | Li |
| 2024/0136070 A1 | 4/2024 | El Saadawi |
| 2024/0201959 A1 | 6/2024 | Callegari |
| 2024/0202173 A1 | 6/2024 | Schillace |
| 2024/0202215 A1 | 6/2024 | Shashanka |
| 2024/0202452 A1 | 6/2024 | Schillace |
| 2024/0202460 A1 | 6/2024 | Schillace |
| 2024/0202582 A1 | 6/2024 | Schillace |
| 2024/0202584 A1 | 6/2024 | Schillace |
| 2024/0205037 A1 | 6/2024 | Callegari |

OTHER PUBLICATIONS

Final Office Action mailed on Jan. 3, 2025, in U.S. Appl. No. 18/122,563, 31 pages.
Non-Final Office Action mailed on Jan. 16, 2025, in U.S. Appl. No. 18/129,668, 22 pages.
Anonymous: "Is there way to submit a table as an JSON file?", Aug. 19, 2022, Retrieved from the Internet: URL: https://web.archive.org/web/20220819203852/https://community.openai.com/t/is-there-way-to-submit-a-table-as-an-json-file/5299, 1 page.
Anonymous: "OpenAI—Spreadsheet creator", Aug. 19, 2022, XP093140385, Retrieved from the Internet: URL: https://platform.openai.com/examples/default-spreadsheet-gen, 1 page.
Anonymous: "Skill Chaining—Wikipedia, the free encyclopedia", Nov. 27, 2015, Retrieved from the Internet: URL: https://web.archive.org/web/20151127070537/https://en.wikipedia.org/wiki/Skill_chaining, 1 page.
Beaumont, Romain., "Semantic search with embeddings: index anything", Dec. 1, 2020, Retrieved from the Internet: URL: https://web.archive.org/web/20221212165434/https://rom1504.medium.com/semantic-search-with-embeddings-index-anything-8fb18556443c, retrieved on Jan. 26, 2024, 27 pages.
Fukamizu, et al., "Generation High resolution 3D model from natural language by Generative Adversarial Network", arxiv.org, Cornell University Library, 201 Olin Library Cornell University Ithaca, NY 14853, Jan. 22, 2019, 9 pages.
Holovaty, Adrian: "Adventures in generating music via ChatGPT text prompts", Dec. 1, 2022, Retrieved from the Internet: URL: https://web.archive.org/web/20221217201750/https://www.holovaty.com/writing/chatgpt-music-generation/, 10 pages.
International Search Report and Written Opinion received for PCT Application No. PCT/US2023/081261, mailed on Feb. 12, 2024, 15 pages.
International Search Report and Written Opinion received for PCT Application No. PCT/US2023/081303, mailed on Mar. 26, 2024, 15 pages.
International Search Report and Written Opinion received for PCT Application No. PCT/US2023/081323, mailed on Mar. 13, 2024, 17 pages.
International Search Report and Written Opinion received for PCT Application No. PCT/US2023/081342, mailed on Mar. 26, 2024, 14 pages.
Konidaris, et al., "Skill Discovery in Continuous Reinforcement Learning Domains using Skill Chaining", Dec. 10, 2009, Retrieved from the Internet: URL: https://proceedings.neurips.cc/paper_files/paper/2009/file/e0cf1f47118daebc5b162 69099ad7347-Paper.pdf, 9 pages.
Magnani, et al., "Semantic Retrieval at Walmart", Proceedings of the 59th ACM/IEEE Design Automation Conference, ACMPUB27, New York, NY, USA, Aug. 14, 2022, pp. 3495-3503.
T, Vincent., "GPT-3 And Code Generation-AI-enabled Instant Software Development", Jan. 12, 2021, retrieved from the Internet: URL: https://becominghuman.ai/gpt-3-and-cod e-generation-ai-enabled-instant-software-d evelopment-270795077cbd, 10 pages.
International Search Report and Written Opinion received for PCT Application No. PCT/US2023/081254, Apr. 10, 2024, 10 pages.
International Search Report and Written Opinion received for PCT Application No. PCT/US2023/081290, Mar. 11, 2024, 17 pages.
International Search Report and Written Opinion received for PCT Application No. PCT/US2023/082379, Apr. 22, 2024, 12 pages.
Notice of Allowance mailed on Aug. 27, 2024, in U.S. Appl. No. 18/129,758, 12 pages.
"Long-term Memory for AI," Vector Database for Vector Search, Pinecone Systems, Inc., retrieved from: https://www.pinecone.io/, Mar. 27, 2023, 10 pages.
Chan Irene, "How to Create Meetings Summaries with OpenAI GPT-3", Dec. 16, 2022, 04 pages.
International Search Report and Written Opinion received for PCT Application No. PCT/US2023/081271, Mar. 13, 2024, 12 pages.
Kan, "Not All Vector Databases Are Made Equal," Towards Data Science, Oct. 2, 2021, retrieved from: https://towardsdatascience.com/milvus-pinecone-vespa-weaviate-vald-gsi-what-unites-these-buzz-words-and-what-makes-each-9c65a3bd0696, Mar. 27, 2023, 15 pages.
Non-Final Office Action mailed on May 8, 2024, in U.S. Appl. No. 18/129,758, 21 pages.
Non-Final Office Action mailed on Sep. 10, 2024, in U.S. Appl. No. 18/122,563, 27 pages.
Final Office Action mailed on Jul. 2, 2025, in U.S. Appl. No. 18/129,668, 26 pages.
International Preliminary Report on Patentability (Chapter I) received for PCT Application No. PCT/US2023/082379, mailed on Jul. 3, 2025, 8 pages.
International Preliminary Report on Patentability Chapter 1 received for PCT Application No. PCT/US2023/081271, mailed on Jul. 3, 2025, 08 pages.
International Preliminary Report on Patentability received for PCT Application No. PCT/US2023/081254, mailed on Jul. 3, 2025, 06 pages.
International Preliminary Report on Patentability received for PCT Application No. PCT/US2023/081261, mailed on Jul. 3, 2025, 09 pages.
International Preliminary Report on Patentability received for PCT Application No. PCT/US2023/081290, Jul. 3, 2025, 15 pages.

(56) References Cited

OTHER PUBLICATIONS

International Preliminary Report on Patentability received for PCT Application No. PCT/US2023/081303, mailed on Jul. 3, 2025, 10 pages.
International Preliminary Report on Patentability received for PCT Application No. PCT/US2023/081323, mailed on Jul. 3, 2025, 11 pages.
International Preliminary Report on Patentability received for PCT Application No. PCT/US2023/081342, mailed on Jul. 3, 2025, 09 pages.
Notice of Allowance mailed on Feb. 12, 2025, in U.S. Appl. No. 18/129,758, 05 pages.
Notice of Allowance mailed on Apr. 30, 2025, in U.S. Appl. No. 18/122,563, 14 pages.
Non-Final Office Action mailed on Apr. 15, 2025, in U.S. Appl. No. 18/129,783, 40 pages.
Non-Final Office Action mailed on Apr. 18, 2025, in U.S. Appl. No. 18/129,772, 15 pages.

* cited by examiner

MULTI-DIMENSIONAL ENTITY GENERATION FROM NATURAL LANGUAGE INPUT

CROSS-REFERENCE TO RELATED APPLICATIONS

This application claims priority to U.S. Provisional Application No. 63/442,034, titled "Multi-Dimensional Entity Generation from Natural Language Input," filed on Jan. 30, 2023, U.S. Provisional Application No. 63/433,627, titled "Multi-Stage Machine Learning Model Chaining," filed on Dec. 19, 2022, and U.S. Provisional Application No. 63/433,619, titled "Storing Entries in and Retrieving Information from an Embedding Object Memory," filed on Dec. 19, 2022, the entire disclosures of which are hereby incorporated by reference in their entirety.

BACKGROUND

In manufacturing and design industries, computer-aided design (CAD) applications and three-dimensional (3D) printing or other manufacturing software offer users the ability to virtually design multi-dimensional entities (MDE), which can be rendered in virtual space and/or produced in the physical world. However, these applications are of limited utility because they are time and labor intensive to use, requiring skilled developers to produce the MDE. Further, once created, the resulting MDE is not easily transferable from one design application to another without significant additional work (e.g., to translate the MDE from one application language to another). Ultimately, these and other deficiencies can limit the utility of such technologies.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to systems and methods for generating a multi-dimensional entity (MDE) with a machine learning model based on natural language (NL) input. A user may provide NL input into an application. One or more skills may be identified for the NL input, each of which has an associated prompt template. For example, a skill is associated with a computer-aided design and/or three-dimensional manufacturing application and/or file format, thereby enabling the generation of output associated with such applications and/or file formats. In examples, a skill chain may be generated that includes one or more skills with which to generate the MDE. Each prompt template may thus be populated based on the NL input, which may be utilized as input for a machine learning model, thereby causing the model to generate MDE output responsive to the NL input. As an example, the output of the machine learning model may include a specification for producing the output MDE in the physical and/or virtual environment. Beneficial aspects of the disclosure include ease of use for individuals with a limited technical background, enhanced creative output, portability of the MDE across diverse applications, and reduced labor/skill requirements and time costs for MDE creation, among other examples.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1A:
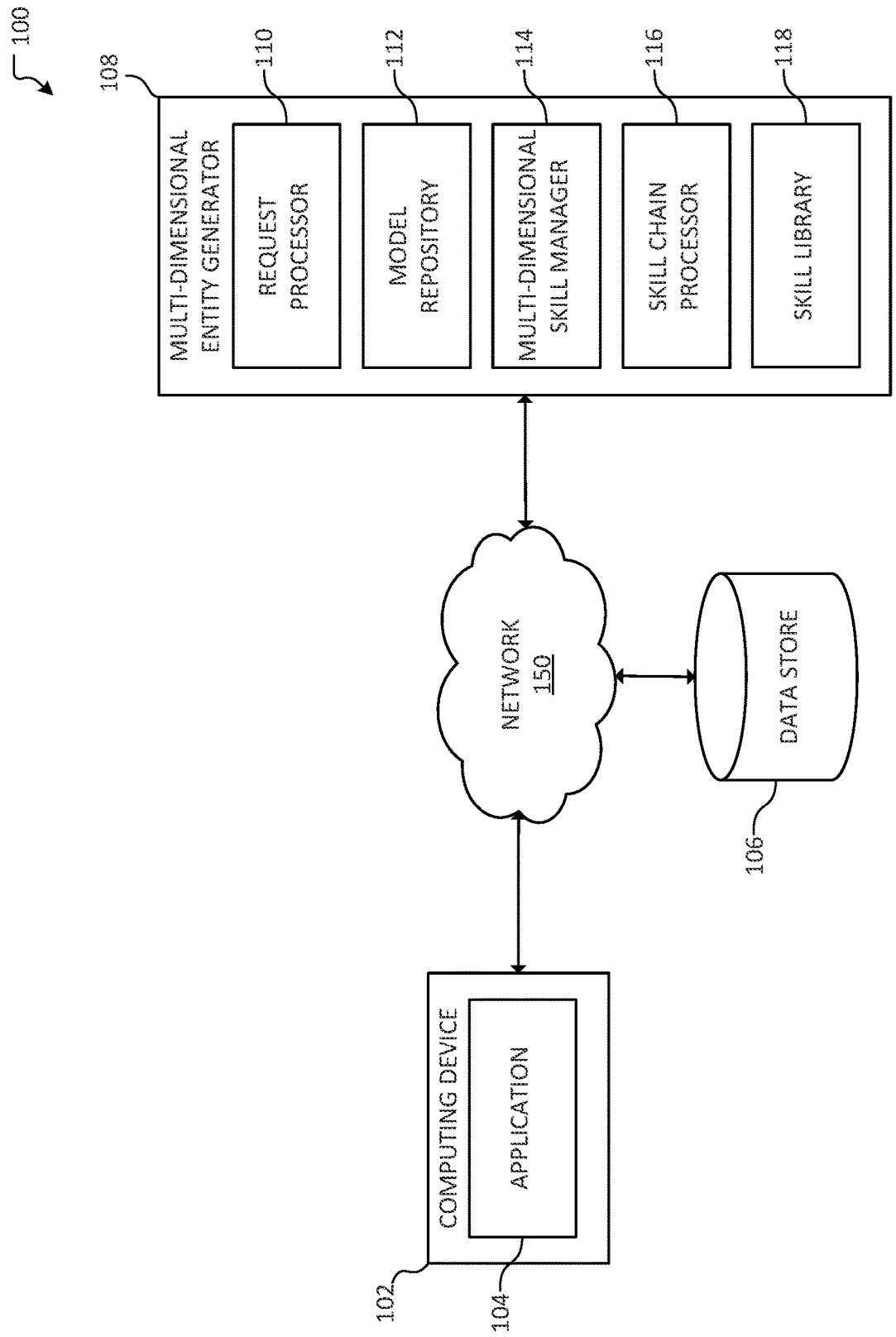
FIG. 1A is a diagram illustrating a system for generating a multi-dimensional entity (MDE) based on a natural language (NL) input, according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a user selects a specific design application to model or otherwise create an multi-dimensional entity (MDE), such as an application corresponding to an associated manufacturing process (e.g., machining, industrial manufacturing, CAD, computer numerical control (CNC) machining or 3D printing, etc.) and/or for modeling a virtual environment, among other examples. However, the user is constrained by such applications in several ways. First, using the design application and interacting with the software may have an associated level of familiarity and/or skill. If the user is unfamiliar or is unskilled, they may be unable to use such applications or may instead hire one or more skilled individuals, thereby resulting in additional time and/or labor constraints, as well as other expenses. From a labor perspective, many design applications, even those with built-in templates, require significant manual construction by the user or the team. Further, licensing such applications may be expensive, which may thus further limit the ability of one or more users to ultimately author or otherwise create an MDE. Finally, an MDE may not be easily transferable between different design applications and/or between the physical and a virtual environment, among other examples. In such an instance, the user may instead manually translate or recreate the MDE from one application and/or data format to another application and/or data format, which may thus consume additional time, skill, and cost.

To address these and other issues, aspects of the present disclosure relate to multi-dimensional entity generation from natural language (NL) input. As used herein, an MDE includes one or more geometric (e.g., two-dimensional/three-dimensional) objects, which may thus include or otherwise be defined by one or more lines, curves, points, parameters, and/or algorithms, among other examples. In examples, an MDE may be at least a part of a virtual environment and/or may be used to fabricate an object in a physical environment according to the geometry of the MDE. MDE output may include a set of instructions (also referred to herein as "MDE instructions"), which may thus define geometry of the MDE (e.g., as may be rendered or otherwise interpreted by a corresponding application) and/or instruct a device to form a physical representation of the MDE, among other examples. Such MDE instructions may have an associated data format, including, but not limited to, an OBJ or STEP file for a virtual representation of an MDE and/or G-code that defines a physical representation of an MDE.

In some examples, an NL input may be provided to an application on a computing device. The NL input may be textual, verbal, and/or any of a variety of other input that describes an MDE to be created according to aspects described herein. For example, the NL input may be from a video game developer who is developing one or more models and/or environments of the video game and provides NL input to "make a knight's helmet that looks like a red dragon for Blender." In this example, the system will receive the NL input and process it to generate model output for a modeling application accordingly. For example, the natural language input is processed to identify one or more skills that are each associated with at least a portion of the user input. As used herein, a skill invokes processing by an ML model to generate model output accordingly. For example, a skill has an associated prompt template, which is used to generate a prompt (e.g., including input and/or context) that is processed using a corresponding ML model to generate model output accordingly. For example, the ML model processes at least a part of the NL input to generate one or more objects, property lists, schemas, and/or function calls, among any of a variety of additional or alternative programmatic code that corresponds to an MDE that can be rendered by the modeling application. In other examples, the model output includes one or more textures, animations, and/or any of a variety of binary output, among other examples. Thus, it will be appreciated that model output may include output that is usable by a software application to render an MDE and/or output that is executable or can otherwise be processed to affect operation of the software application, thereby causing the application to generate at least a part of the MDE, among other examples. In other examples, an ML model associated with a model skill need not have an associated prompt template, as may be the case when prompting is not used by the ML model when processing input to generate model output.

In examples, multiple skills are used to process NL input, as may be the case when different portions of the NL input correspond to different skills and/or processing the NL input in a single interaction with the ML model exceeds the capability of the ML model. For instance, the input to the ML model may exceed the token limit of the ML model. As a result, the NL input is processed according to a skill chain in some examples, where multiple skills are used to generate various constituent objects of the MDE, to produce MDE instructions corresponding to a target application/data format (e.g., to render the MDE), and/or to combine output of previous skills into final MDE output, among other examples. A subsequent skill of a skill chain may thus process intermediate output from one or more previous skills of the skill chain. It will be appreciated that a single skill may be used in some examples (e.g., as may be the case when a skill exists for generating MDE output for a given software application) and/or multiple skills may be used (e.g., as may be the case when a first skill generates geometry based on at least a part of the NL input, while a second skill transforms the geometry according to a specified output format indicated by another part of the NL input. It will be appreciated that, in some examples, a skill of the skill chain may additionally or alternatively include programmatic processing (e.g., as compared to ML processing of one or more other skills of the skill chain). Further, a skill chain may include any number of skills Returning to the above example, the system may identify the portions of the NL input relating to "knight's helmet" and "red dragon," which may be processed by associated skills accordingly (e.g., relating to object generation and texture generation, respectively). The portion "for Blender" may similarly be recognized as having an associated skill, such that the aspects of the MDE that are generated by the skills relating to "knight's helmet" and "red dragon" are further processed to yield MDE output for the target application/data format.

As used herein, a skill may have an associated prompt template (e.g., as may be obtained from a skill library). In examples, prompt templates may be identified by generating an embedding for the NL input and the determining one or more semantically associated prompt templates using the embedding for the NL input. As another example, the one or more skills are identified as a result of an ML model processing the NL input in conjunction with a description or other indication of one or more skills that are available from the skill library, such that the ML model generates output indicating a skill chain accordingly.

Once the skills have been identified, the prompt templates for each of the skills are populated (e.g., with at least a part of the NL input and/or output from one or more previously processed skills) and are processed using an ML model to ultimately generate an output MDE responsive to the given NL input. Each ML model evaluation corresponds to a skill of the skill chain. As noted above, a skill may correspond to a target application and/or data format, such that a skill of the skill chain transforms intermediate output from one or more previous skills into MDE output that conforms to the target application and/or data format. In examples, an embedding object memory is included, such that an embedding corresponding to the NL input and/or the generated MDE may be generated and stored in the embedding object memory, thereby enabling subsequent retrieval. As an example, subsequent NL input may reference a generated MDE output, for example to transform the MDE output from a first format to a second format or to change aspects of the MDE output, among other examples. Thus, it will be appreciated that a prompt template may be populated with context from an embedding object memory in some examples.

In examples, the output MDE is displayed to the user on their computing device. The user, upon viewing the MDE output, may provide additional NL input to modify the MDE (e.g., "now make the dragon breathe fire," "now make the dragon helmet for a human and an orc," etc.) and/or to create a new MDE (e.g., "now make a full set of knight's armor that matches the dragon helmet"). The system will thus process the additional NL input according to aspects described herein. For example, context associated with the previous MDE output may be identified (e.g., from the embedding object memory) and used to generate additional MDE output based on the previous NL input accordingly. Additionally, or alternatively, the user may request that the MDE output be transformed according to a different application/data format, such that the MDE output is further processed (e.g., according to one or more skills) to generate MDE output corresponding to the indicated application/data format accordingly (e.g., MDE output corresponding to the 3D modeling application may be transformed into G-code or other instructions for fabrication, or vice versa). As another example, a user may provide additive or subtractive natural language input, for example where the user specifies geometry to be added to or removed from the MDE. Thus, the disclosed aspects enable a user to iteratively author an MDE through successive input, such that ML processing is used to add to, remove from, or otherwise refine the MDE based on the user input accordingly.

The disclosed aspects provide various benefits for the user. First, the ability to use NL input for MDE creation simplifies the creative process, especially for users with a limited technical background by enabling them to simply describe a complex MDE based on their personal understanding of the MDE. Further, the feedback element or iterative nature (e.g., where the user may view the MDE output and provide additional feedback) enhances the potential for creative output and the ease with which a user can refine or otherwise change the MDE. Another benefit is the portability of the MDE across diverse applications (e.g., both in physical and virtual environments), with reduced or without additional manual processing. As such a user, especially one that is part of a larger team or organization, may develop an MDE for one purpose and application (e.g., a virtual reality gaming) while a different member of the team may utilize the same MDE for a different purpose and application (e.g., marketing the product as a 3D printed item) by requesting that the MDE be adapted for a different application/data format. These and other benefits may thus reduce labor requirements, processing time, and the associated cost of creating an MDE, while also improving the associated user experience and enabling creative output for developers.

While examples are described in which NL input is processed to generate MDE input, it will be appreciated that similar techniques may be used to process any of a variety of additional and/or alternative inputs. For example, an MDE in a first format (e.g., relating to a first application and/or data format) may be provided as input, such that MDE output is generated for the MDE in a second data format (e.g., relating to a first application and/or data format) that is different than the first data format. Thus, it may be possible for a user to transform MDEs between various applications and/or data formats, among other examples.

FIG. 1A is a diagram illustrating a system for generating an MDE based on an NL input, according to aspects described herein. As illustrated, system 100 includes a computing device 102, a data store 106, a multi-dimensional entity (MDE) generator 108, and a network 150. The computing device 102 is illustrated as including application 104. As illustrated, the MDE generator 108 includes request processor 110, machine learning model repository 112, multi-dimensional skill manager 114, skill chain processor 116, and skill library 118. While MDE generator 108 is illustrated as including a single instance of elements 110-118, it will be appreciated that any other number of such elements may be used in other examples. Further, such elements may additionally or alternatively be implemented at a variety of other computing devices, such as computing device 102.

As illustrated, the computing device 102, data store 106, MDE generator 108, and skill library 118 communicate via the network 150. The network 150 may comprise one or more networks such as local area networks (LANs), wide area networks (WANs), enterprise networks, the Internet, etc. and may include one or more of wired, wireless, and/or optical portions.

In example aspects, the computing device 102 may be any of a variety of computing devices, including, but not limited to, a mobile computing device, a laptop computing device, a tablet computing device, a desktop computing device, and/or a virtual reality computing device. Computing device 102 may be configured to execute one or more design applications (or "applications") such as application 104 and/or services and/or manage hardware resources (e.g., processors, memory, etc.), which may be utilized by users of the computing device 102. The application 104 may be a native application or a web-based application. The application 104 may operate substantially locally to the computing device 102, or may operate according to a server/client paradigm in conjunction with one or more servers (not shown). The application 104 may be used for communication across the network 150 for the user to provide NL input and to receive and view the MDE output from the MDE generator 108.

In an example, a user may operator or otherwise access the application 104 on computing device 102 to create an MDE based on NL input. As noted above, the MDE may be created for a physical environment and/or a virtual environment, among other examples. While system 100 is described in an example where NL input is obtained via application 104, it will be appreciated that NL input may be obtained from any of a variety of other sources. For example, NL input may be programmatically generated by application 104 or may be based on content of a file or an electronic communication, among other examples.

The user may provide NL input to the computing device 102 as verbal input, textual input, and/or as any of a variety of other inputs (e.g., text-based, images, video, etc.). For example, the NL input is provided via one or more input devices of the computing device 102 (e.g., microphone, camera, keyboard, uploading an image or video from local storage or data store 106, etc.), which are not pictured in FIG. 1A. The input may describe an MDE of varying complexity, for example based on the specificity of the concept the user wishes to describe. For example, an MDE of relatively simple complexity may be a toy dinosaur for a 3D printing application with certain dimensions, number of teeth, color, etc. The user may provide the input as spoken input (e.g., via a microphone) and/or as textual input (e.g., with a keyboard) with instructions such as "make an orange T-rex dinosaur, that is 4 inches tall by 1 inch wide by 5 inches long, with its mouth open, and output the dinosaur as G-code." While example NL input is provided, it will be appreciated that the NL input need not be in a particular format, contain proper grammar or syntax, or include a complete description of the MDE that the user intends the model to generate. While the amount of detail provided by the user may improve the resulting MDE output, sparse user input such as "make a nacho milkshake, G-code" are similarly sufficient for MDE generation.

A user input may also reference previously created objects or known objects (e.g., as may be stored within data store 106 and/or skill library 118). Additionally, or alternatively, while examples are described in which NL input is used to generate MDE output, it will be appreciated that an image or any of a variety of other data types may be processed to generate MDE output according to aspects described herein.

For example, a user may participate in an online gaming experience where they have a virtual character, a knight, that they consistently play with. The user may have the ability to customize their design of the knight based on their own design preferences. In one instance, the use may have the option to upgrade their armor including a helmet with a personalized design. The user may provide user input to the application 104 for the desired helmet design. The user input may be detailed or vague. In some examples, the user may have a specific helmet and dragon design in mind. As such, the application 104 may enable the user to describe the design in detail and even upload images or video (e.g., as may each be processed according to an associated skill and/or ML model) corresponding to the desired MDE. For example, the user may upload an image of a roaring dragon and provide the NL input of "make my knight's helmet look like the uploaded image." In this case, the portion "my knight's helmet" may correspond to a previous helmet MDE stored in a data store 106, such that a semantic embedding and/or associated content is identified from data store 106 and used to generate an updated or a new MDE accordingly. In another example, the user may provide more general input to the application such as "make my knight's helmet look like a red dragon," where the user does not necessarily design or describe the exact features and specifications of the MDE in the user input. For each of the example user inputs described above, the MDE generator 108 processes the user input using one or more machine learning models from model repository 112 to create an output MDE responsive to the user input as described herein.

In some examples, the user input includes an indication of an application, data format, and/or other specification type, according to which the MDE output is to be generated. For example, continuing the dragon helmet example, the user may include in their NL input a specification type for a virtual environment in Blender by specifying it directly in the input: "make my knight's helmet look like the uploaded image, in Blender" and/or by selecting the Blender option from a drop-down menu, among other example inputs. The user may include multiple specification types, for example for a physical output and/or a virtual environment, among other examples. For example, the user may decide to fabricate the red dragon helmet MDE with a 3D printer as a piece of art. As such, the NL input could include an indication to generate MDE output corresponding to both Blender and G-code, among other examples. In some examples, if no indication of a specification type is included in the NL input, the request processor 110 may prompt the user to provide a desired specification type (e.g., after the initial user input is obtained by the application 104).

Accordingly, MDE generator 108 processes NL input received by application 104 and/or from any of a variety of other sources according to aspects described herein. For example, the request processor 110 may process received NL input to facilitate the generation of MDE output according to aspects described herein. As such, the request processor 110 may receive the NL input (e.g., from computing device 102) and provide it to multi-dimensional skill manager 114 for further processing to generate MDE output accordingly. In some examples, the request processor 110 may also evaluate generated MDE output prior to providing it to a requesting device, as is discussed in greater detail below.

As illustrated, MDE generator 108 includes model repository 112, which may include any of a variety of ML models. A generative model (also generally referred to herein as a type of ML model) used according to aspects described herein may generate any of a variety of output types (and may thus be a multimodal generative model, in some examples) and may be a generative transformer model, a large language model (LLM), and/or a generative image model, among other examples. Example ML models include, but are not limited to, Generative Pre-trained Transformer 3 (GPT-3), BigScience BLOOM (Large Open-science Open-access Multilingual Language Model), DALL-E, DALL-E 2, Stable Diffusion, or Jukebox. Additional examples of such aspects are discussed below with respect to the generative ML model illustrated in FIGS. 4A-4B. Additionally or alternatively, one or more recognition models (or any of a variety of other types of ML models) may produce their own output that is processed as part of a skill chain according to aspects described herein.

The multi-dimensional skill manager 114 associates one or more skills (e.g., of skill library 118, each of which has an associated prompt template) with at least a portion of the NL input (thereby generating a skill chain), populates each prompt template according to at least a portion of the NL input and/or previously generated output by one or more other skills, and processes the skill chain accordingly.

In examples, the multi-dimensional skill manager 114 analyzes the NL input to identify one or more skills with which to generate MDE output, each of which may be semantically associated with at least a portion of the NL input. As another example, the one or more skills are identified as a result of an ML model (e.g., of model repository 112) processing the NL input in conjunction with a description or other indication of one or more skills that are available from the skill library 118, such that the ML model generates output indicating a skill chain accordingly. In examples, a skill has an associated model in model repository 112, such that a resulting prompt for the skill is processed by the corresponding model accordingly. It will be appreciated that each skill of a skill chain need not use the same model, such that skills of the skill chain may invoke different types of ML model processing (e.g., generative text processing, generative image processing, classification, etc.).

The skills are "chained" together in sequence as a skill chain, then processed using a set of ML model evaluations to ultimately create an output MDE responsive to the given NL user input. Skills may be chained together according to any of a variety of techniques. For example, a skill chain may include one or more sequential skills, a hierarchical set of skills, a set of parallel skills, and/or a skill that is dependent on or otherwise processes output from two or more skills, among other examples. Additionally, a skill chain may include any of a variety of other types of skills. For example, one or more skills may be chained together with a programmatic skill. For example, a programmatic skill may read the content of a file, obtain data from a data source and/or from a user, send an electronic message containing model output, create a file containing model output, and/or execute programmatic output that is generated by a model skill.

Once the skill chain is generated, each corresponding prompt template is populated by the skill chain processor 116. It will be appreciated that a prompt template may include any of a variety of data, including, but not limited to, natural language, image data, audio data, video data, and/or binary data, among other examples. In examples, a prompt template is populated with context, as may include known objects that were previously created or input to the system, thereby enabling a user to reference previously created MDEs and/or any of a variety of other content. For example, data store 106 may include one or more embeddings associated with previously generated MDE output and/or previously processed NL input, thereby enabling semantic retrieval of such context according to aspects described herein (e.g., such that previously generated MDE output may be iterated upon). Such aspects may be referred to herein as an "embedding object memory," where one or more semantic embeddings are associated with content, thereby enabling subsequent retrieval of the embeddings and/or content (e.g., according to semantic similarity). One or more fields, regions, and/or other parts of the prompt template may be populated (e.g., with input and/or context), thereby generating a prompt that can be processed by an ML model of the model repository 112 according to aspects described herein.

The skill chain is processed by the skill chain processor 116, for example using one or more ML models of model repository 112 according to aspects described herein. Due to the nature and complexity of an MDE that may be described as an NL input, each skill of the skill chain may generate at least a portion of the described MDE. For example, processing a skill of the skill chain may produce intermediate output that includes an MDE portion, which is ultimately combined to generate the resulting MDE output that is responsive to the NL input. In an example, a final skill of a skill chain may generate MDE output according to an application and/or data format that was indicated by the NL input.

In examples, context is processed as part of the ML model evaluation for a given skill, as may be obtained from data store 106. In addition to chaining prompts together to generate MDE output, an associated context may be shared among or otherwise used by a plurality of skills in the skill chain. For example, at least a part of the context that is used for processing associated with a first skill (or, in other examples, a plurality of skills) may be used by a second skill. In some examples, the context associated with the skill may be changed by a first ML model evaluation (e.g., of the first skill) that occurs prior to or contemporaneously with processing by a second ML model evaluation (e.g., for the second skill), such that the second ML model evaluation uses the updated context accordingly.

As a result of the disclosed chaining techniques, it may be possible to accomplish tasks and/or create an MDE that would otherwise not have been possible via a singular ML model evaluation. For instance, information can be obtained from one or more data stores (e.g., data store 106), skill libraries (e.g., skill library 118), and/or input can be requested from the user while processing a skill chain, which is then used in subsequent processing (e.g., by one or more subsequent skills of the skill chain). As another example, evaluation of the skill chain may be dynamically adapted as a result of a constituent evaluation, thereby affecting one or more future evaluations of the skill chain (e.g., by adding an evaluation, removing an evaluation, or changing an evaluation). Further, the skill chain itself may be managed, orchestrated, and/or derived by an ML model of model repository 112 (e.g., by a generative ML model based on NL input that is received from a user and/or input that is generated by or otherwise received from an application). Additionally, given different ML models of model repository 112 may be chained together (e.g., which may each generate a different type of model output), the resulting MDE output may be output that would not otherwise be produced as a result of processing by a single ML model.

Thus, processing performed by the multi-dimensional skill manager 114 and the skill chain processor 116 generate MDE output, which may include a description, meta language, programmatic code, and/or a set of instructions associated with an application and/or data format that thus define the MDE object accordingly. For example, NL input that requests an MDE object for 3D printing or CNC manufacturing may result in MDE output including G-code. As another example, NL input that requests an MDE object for a virtual environment may result in MDE output that includes output associated with virtual reality modeling language (VRML), Blender, and/or a CAD application, among other examples. It will be appreciated that the generated MDE output may include output corresponding to both physical and virtual environments, among other examples. Further, in instances where NL input does not specify an application and/or data format for the MDE output, a default or generic output format may be used. In such an example, the user may indicate a target application/data format at a later time (also referred to herein as a "target output indication"), such that default or generic MDE output is transformed to the indicated target application/data format accordingly.

In some instances, prior to returning the MDE to the user, request processor 110 may determine that the resulting MDE output is inadequate or not responsive to the user input. In some examples, this may be the result of the MDE failing to exceed a predetermined confidence threshold or due to an indication of an error or other issue that is received (e.g., as a result of processing of at least a part of the MDE output, as may be the case when the model output includes code or other output that is syntactically incorrect or otherwise malformed), among other examples. In some examples, the request processor 110 may reinitiate the process for generating the MDE such that another MDE is created. In other examples, the request processor 110 may provide a failure indication to application 104 for display to the user, for example indicating that the user may retry or reformulate the user input, that the user input was not correctly understood, or that the requested functionality may not be available. While example issues and associated issue handling techniques are described, it will be appreciated that any of a variety of other issues and/or issue handling techniques may be encountered/used in other examples.

As will be appreciated, the various methods, devices, apps, nodes, features, etc., described with respect to FIG. 1A or any of the figures described herein, are not intended to limit the system to being performed by the particular apps and features described. Accordingly, additional configurations may be used to practice the methods and systems herein and/or features and apps described may be excluded without departing from the methods and systems disclosed herein. For example, in addition to or as an alternative to model repository 112, MDE generator 108 may use a machine learning service separate from MDE generator 108. As another example, computing device 102 may implement various aspects of elements 110-118 in addition to or as an alternative to the above-described aspects that were, for example, implemented by MDE generator 108.

Figure 1B:
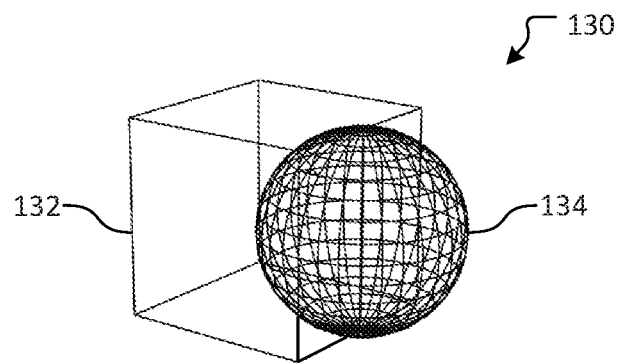
FIGS. 1B, 1C, and 1D are conceptual diagrams illustrating example geometries for an MDE according to aspects described herein.
Figure 1C:
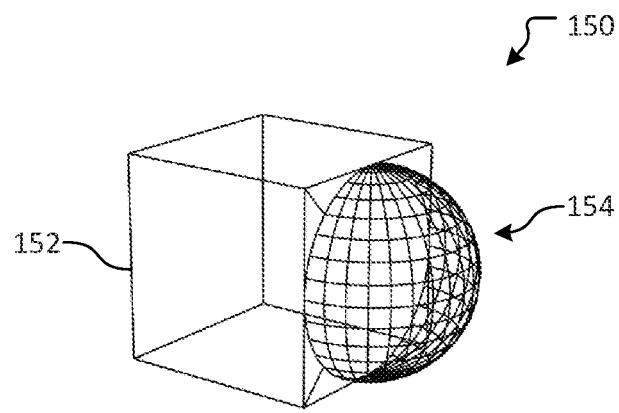
Figure 1D:
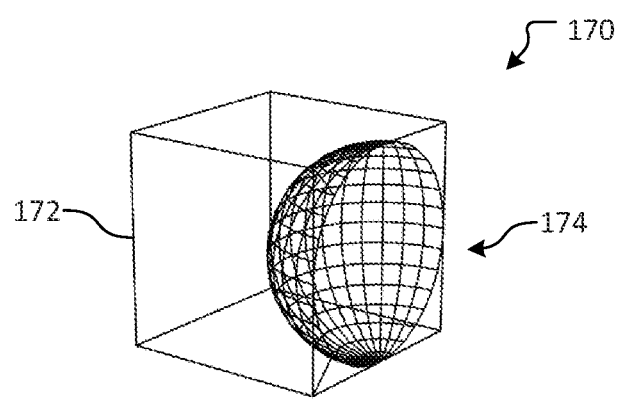

FIGS. 1B, 1C, and 1D are conceptual diagrams illustrating example geometries for an MDE according to aspects described herein. With reference to FIG. 1B, example MDE 130 is illustrated, which includes cube 132 and sphere 134. For example, the illustrated MDE may have been generated based on natural language including an instruction to include a cube (e.g., cube 132) and a sphere (e.g., sphere 134). Turning now to FIG. 1C, example MDE 150 is depicted, which includes shape 152. Example MDE 150 is provided as an example of an additive operation, for example where a user provided an instruction to include a cube (e.g., cube 132 in FIG. 1B) and to further add a sphere (e.g., cube 134) to the included cube, thereby yielding shape 152 that includes spherical portion 154. Similar to FIG. 1C, FIG. 1D illustrates example MDE 170, where, instead of an additive operation, a subtractive operation was performed. For example, a user may have provided an instruction to subtract a sphere (e.g., sphere 134 in FIG. 1B) from a cube (e.g., cube 132), thereby yielding shape 172 having spherical omission region 174. Thus, as noted above, it will be appreciated that the disclosed aspects may be used for additive (e.g., FIG. 1C) and/or subtractive (e.g., FIG. 1D) operations, among other examples.

Figure 2:
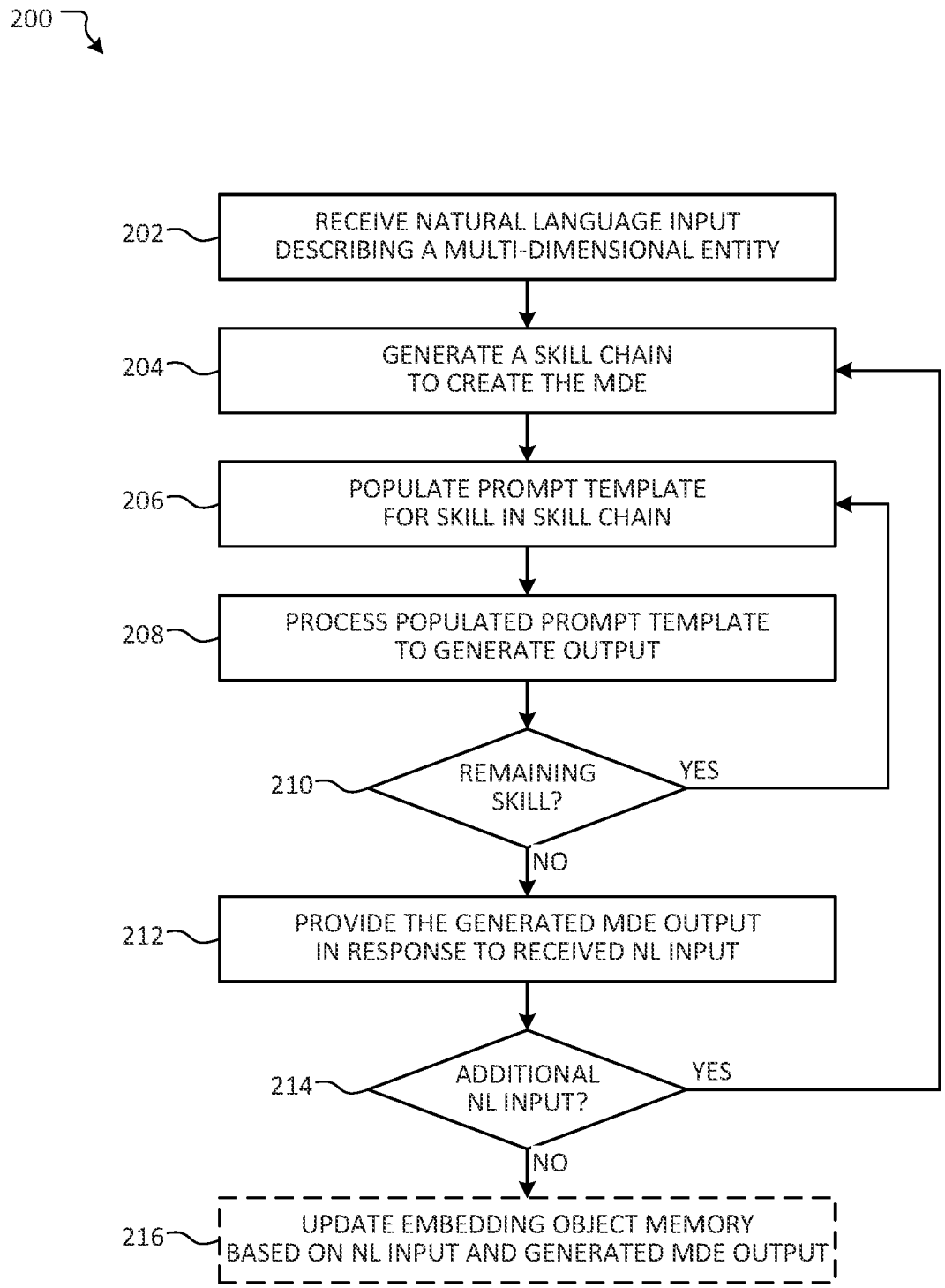
FIG. 2 is a block diagram illustrating a method for generating an MDE based on an NL input, according to aspects described herein.

FIG. 2 is a block diagram illustrating a method 200 for generating an MDE based on an NL input, according to aspects described herein. A general order of the operations for the method 200 is shown in FIG. 2. Generally, the method 200 begins with operation 202 and ends with operation 216. The method 200 may include more or fewer steps or may arrange the order of the steps differently than those shown in FIG. 2. The method 200 can be executed as computer-executable instructions executed by a computer system and encoded or stored on a computer readable medium or other non-transitory computer storage media. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4, 5, 6, and 7.

At operation 202, NL input indicating an MDE is received. For example, the NL input may be received by a request processor (e.g., request processor 110) of an MDE generator (e.g., MDE generator 108). The user may provide NL input via an application (e.g., application 104) on a computing device (e.g., computing device 102). The NL input may be verbal and/or textual input, among other examples, that describes the MDE that is to be generated. In examples, the NL input includes an indication of a target application and/or data format to which the generated MDE output should conform. In some examples, if the NL input does not include such an indication, MDE output may be generated according to a default or generic output format. As another example, the user may be prompted (e.g., by request processor 110) to provide an indication of a target application and/or data format (e.g., as part of generating an initial MDE output and/or after the initial MDE output has been generated).

At operation 204, a skill chain is generated with which to create the described MDE. In examples, aspects of operation 204 are performed by a multi-dimensional skill manager, such as multi-dimensional skill manager 114 in FIG. 1A. As noted above, the skill chain may be composed of one or more skills from a skill library (e.g., skill library 118 in FIG. 1A), as may be identified by the multi-dimensional skill manager. In examples, the identified skill(s) are semantically associated with at least a portion of the NL input that was received at operation 202. In other examples, a set of descriptions corresponding to skills of the skill library are used to populate a prompt template (e.g., in conjunction with at least a part of the received NL input), thereby causing an ML model (e.g., of a model repository, such as model repository 112 in FIG. 1A) to generate at least a part of the skill chain. Once created, the skill chain may form a sequence for processing the NL input according to a set of interactions with one or more ML models. As noted above, a skill chain may include skills corresponding to ML processing and, in some examples, one or more skills corresponding to programmatic or computational processing, among other examples.

At operation 206, a prompt template corresponding to a skill of the skill chain is populated (e.g., as may be performed by a skill chain processor, such as skill chain processor 116 in FIG. 1A). The prompt template may be obtained from a data store (e.g., data store 106) and/or a skill library (e.g., skill library 118). As noted above, the prompt template is populated to include at least a part of the NL input that was received at operation 202. In examples, the prompt template is further populated to include context (e.g., as may be obtained from an embedding object memory, according to aspects described herein).

At operation 208, the populated prompt template is processed (e.g., by a skill chain processor, such as skill chain processor 116) to generate output according to aspects described herein. In examples, operation 208 comprises processing the prompt template using an ML model (e.g., of model repository 112) to generate the output. As noted above, the generated output may be intermediate output (e.g., as may be processed by one or more subsequent skills in the skill chain). In examples, the generated output includes at least a part of the MDE output for the NL input that was received at operation 202.

At determination 210, it is determined whether there is a remaining skill in the skill chain that was generated at operation 204. In examples, the skill chain is updated as a result of the processing that was performed at operation 208 described above. Determination 210 may comprise evaluating the skill chain to determine whether there is a skill that has not yet been processed. If it is determined that there is not a remaining skill, flow branches "NO" to operation 212, which is discussed below.

By contrast, if it is instead determined there is a remaining skill, flow branches "YES" and returns to operation 206, where a prompt template for a subsequent skill is populated and processed accordingly. Thus, flow loops between operations 206-210 in instances where one or more skills remain. Subsequent iterations of operation 208 may use generated output of a previous iteration of operation 208 as input (e.g., as may be included in a populated prompt template at operation 206) when generating subsequent model output.

Thus, as a result of processing the NL input according to a skill chain, subparts of the MDE may be generated according to associated skills and/or MDE generation may be divided into multiple portions, thereby accommodating potential limitations (e.g., a token limit and/or processing time constraints) on the ML model with which the processing is performed. Further, as noted above, multiple types of ML models may be used for processing a skill chain according to aspects described herein. For example, the disclosed aspects may enable a user to request that a two-dimensional representation of an MDE description is generated, which may then further be transformed into a three-dimensional representation.

Further, the MDE output that is generated as a result of processing the skill chain may be for any of a variety of target applications and/or include output formatted according to any of a variety of data formats. In examples, a first set of skills of the skill chain generate geometry corresponding to the described MDE, while a second set of skills transform the generated geometry into MDE output according to an indicated target application and/or data format. Thus, the first set of skills may be similar regardless of the output format that was indicated by the received NL input, while the second set of skills may change accordingly (e.g., as a result of the processing performed at operation 204). Similarly, the disclosed aspects may thus enable portability of MDE output across any of a variety of applications and/or data formats.

Eventually, method 200 arrives at operation 212, where the MDE output is provided in response to the NL input that was received at operation 202. For example, the MDE output is provided to an application of a computing device (e.g., application 104 of computing device 102), where it may be presented to a user of the computing device accordingly. In some examples, operation 212 comprises validating the MDE output prior to providing the MDE output. For example, the MDE output may fail validation if it does not meet a predetermined confidence threshold or if there is an indication of an error or other issue when processing the MDE output (e.g., as may be the case when the output includes code or other output that is syntactically incorrect), among other examples. In instances where the MDE output fails validation, a subsequent iteration of method 200 may be performed to generate another instance of MDE output accordingly. In other examples, a failure indication may additionally or alternatively be provided at operation 212.

At determination 214, it is determined if additional NL input is received. For example, additional NL input may be received if a user determines to modify the MDE output (e.g., with additional details, to change a target application and/or data format, and/or if the generated MDE output was not responsive to the user's input). In other examples, additional user input may be received to add additional aspects to the generated MDE output or to create a new MDE entirely. If additional user input is received, the flow branches "YES" and progresses to operation 204, where the additional NL input is processed as described above.

By contrast, if no additional NL input is received, then flow branches "NO" and progresses to operation 216 where an embedding object memory is updated based on the NL input and/or the generated MDE object according to aspects described herein. For example, an embedding may be generated for the received NL input, such that at least a part of the generated MDE and/or any of a variety of additional or alternative associated content may be stored in association with the embedding, thereby facilitating later retrieval. For example, the content may be retrieved as context when processing subsequent user input, thereby enabling future reference to the MDE object. Operation 216 is shown as an optional step with a dashed line to indicate that, in other examples, operation 216 may be omitted.

Figure 3:
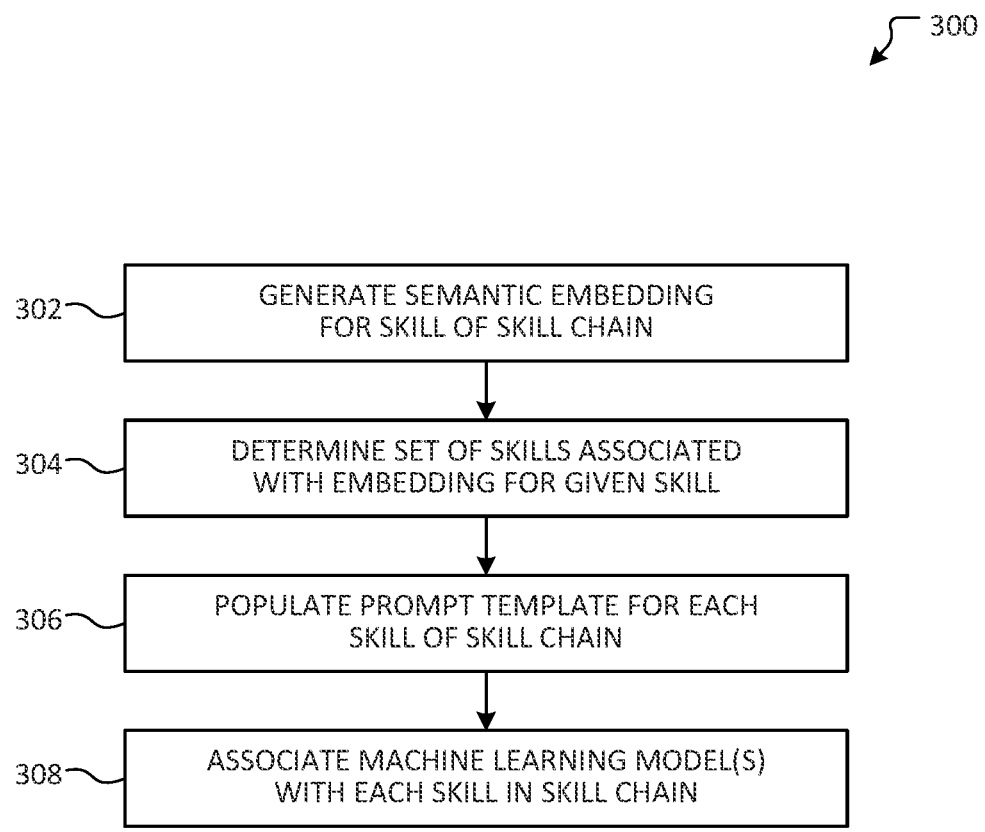
FIG. 3 is a block diagram illustrating a method for generating a skill chain, where each skill has an associated prompt template, according to aspects described herein.

FIG. 3 is a block diagram illustrating a method 300 for generating a skill chain, where each skill has an associated prompt template, according to aspects described herein. A general order of the operations for the method 300 is shown in FIG. 3. Generally, the method 300 begins with operation 302 and ends with operation 308. The method 300 may include more or fewer steps or may arrange the order of the steps differently than those shown in FIG. 3. The method 300 can be executed as computer-executable instructions executed by a computer system and encoded or stored on a computer readable medium or other non-transitory computer storage media. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2, 4, 5, 6, and 7.

At operation 302, an embedding is generated for each skill of a skill chain. In examples, a skill chain processor (e.g., skill chain processor 116) identifies a semantic context for one or more skills of the skill chain. As an example, a skill may be processed by an ML model (e.g., of model repository 112) to generate a semantic embedding that encodes a semantic meaning for the skill, thereby enabling relevant context to be identified for the skill accordingly.

At operation 304, a skill chain processor (e.g., skill chain processor 116) uses the generated semantic embedding to identify a set of skills that is associated with the semantic embedding. For example, one or more semantic searching techniques may be used (e.g., nearest neighbor, approximate nearest neighbor, etc.) to determine the set of skills. The skills may be identified from a data store (e.g., data store 106) and/or a skill library (e.g., skill library 118). As an example, a threshold may be used to exclude skills that are too distant (e.g., dissimilar) from the semantic embedding that was generated at operation 302.

Flow progresses to operation 306, where prompt templates corresponding to skills of the skill chain are populated based on a corresponding set of skills that was determined at operation 304. Thus, the prompt templates, once populated, comprise a series of prompts for one or more ML models (e.g., of model repository 112) to generate intermediate output and/or the ultimate MDE output according to aspects described herein.

At operation 308 one or more ML models may be associated with each skill of a skill chain (e.g., by a skill chain processor, such as skill chain processor 116 in FIG. 1A). For example, an ML model that is adept at or otherwise trained for a certain application, data format, medium (e.g., virtual/physical), and/or other output type may be associated with the skill prior to processing, such that the associated ML model is used when processing the populated prompt template accordingly.

Figure 4A:
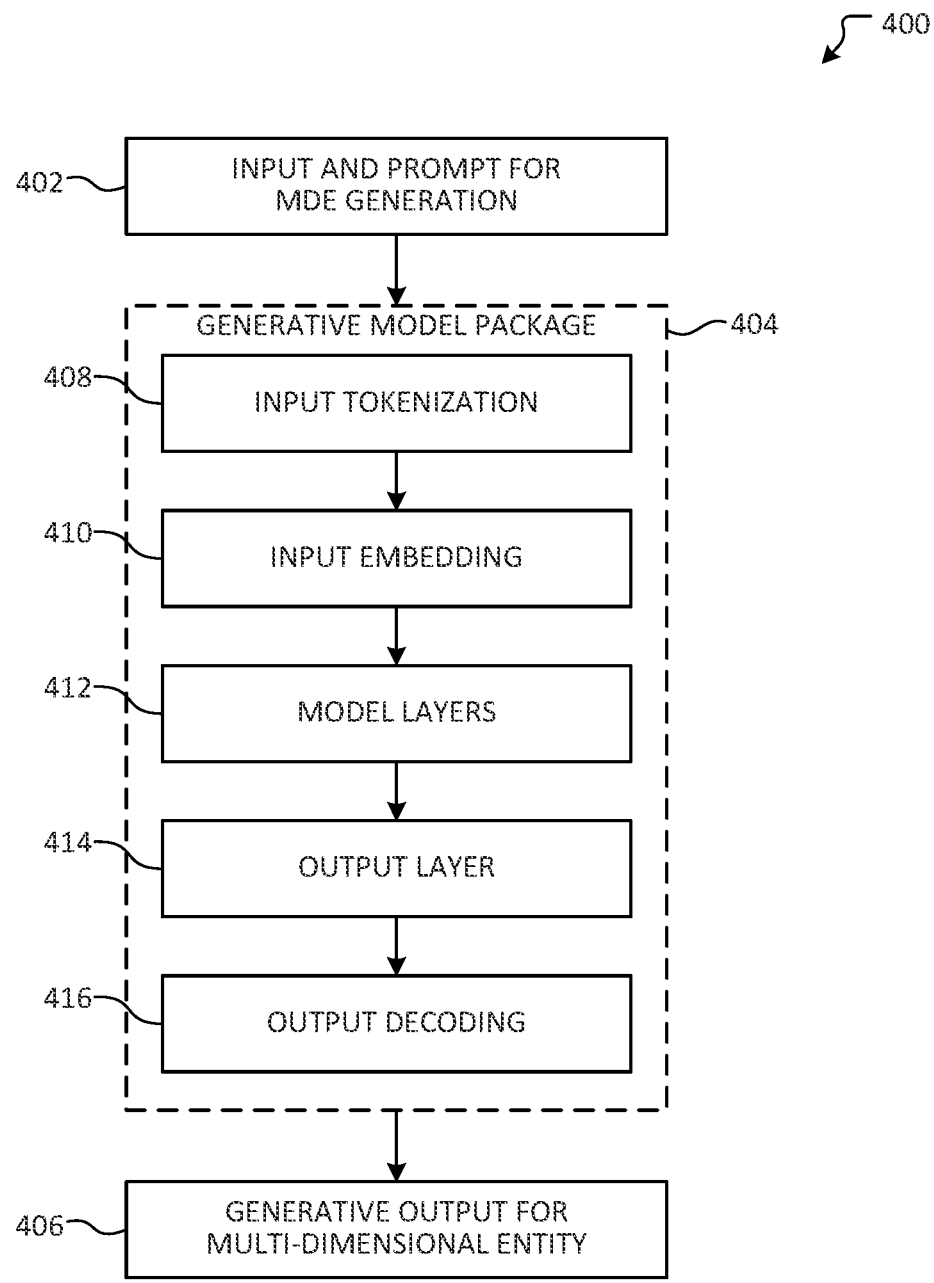
FIGS. 4A and 4B illustrate overviews of an example generative machine learning model that may be used according to aspects described herein.
Figure 4B:
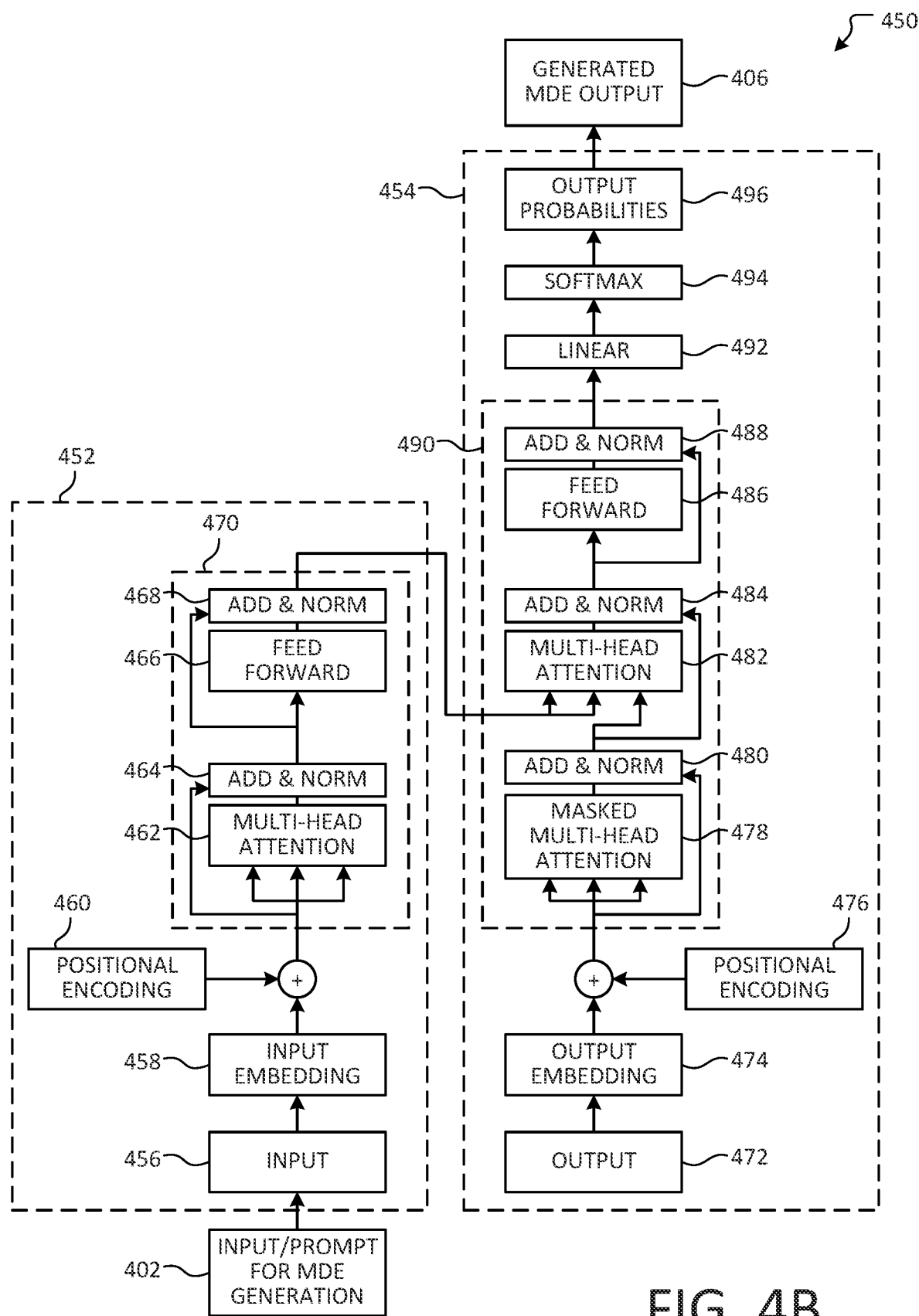

FIGS. 4A and 4B illustrate overviews of an example generative machine learning model that may be used according to aspects described herein. With reference first to FIG. 4A, conceptual diagram 400 depicts an overview of pre-trained generative model package 404 that processes an input and a prompt 402 to generate MDE output 406 aspects described herein. Examples of pre-trained generative model package 404 includes, but is not limited to, Megatron-Turing Natural Language Generation model (MT-NLG), Generative Pre-trained Transformer 3 (GPT-3), Generative Pre-trained Transformer 4 (GPT-4), BigScience BLOOM (Large Open-science Open-access Multilingual Language Model), DALL-E, DALL-E 2, Stable Diffusion, or Jukebox.

In examples, generative model package 404 is pre-trained according to a variety of inputs (e.g., a variety of human languages, a variety of programming languages, and/or a variety of content types) and therefore need not be finetuned or trained for a specific scenario. Rather, generative model package 404 may be more generally pre-trained, such that input 402 includes a prompt that is generated, selected, or otherwise engineered to induce generative model package 404 to produce certain generative model output 406. For example, a prompt includes a context and/or one or more completion prefixes that thus preload generative model package 404 accordingly. As a result, generative model package 404 is induced to generate output based on the prompt that includes a predicted sequence of tokens (e.g., up to a token limit of generative model package 404) relating to the prompt. In examples, the predicted sequence of tokens is further processed (e.g., by output decoding 416) to yield output 406. For instance, each token is processed to identify a corresponding word, word fragment, or other content that forms at least a part of output 406. It will be appreciated that input 402 and generative model output 406 may each include any of a variety of content types, including, but not limited to, text output, image output, audio output, video output, programmatic output, and/or binary output, among other examples. In examples, input 402 and generative model output 406 may have different content types, as may be the case when generative model package 404 includes a generative multimodal machine learning model.

As such, generative model package 404 may be used in any of a variety of scenarios and, further, a different generative model package may be used in place of generative model package 404 without substantially modifying other associated aspects (e.g., similar to those described herein with respect to FIGS. 1, 2, and 3). Accordingly, generative model package 404 operates as a tool with which machine learning processing is performed, in which certain inputs 402 to generative model package 404 are programmatically generated or otherwise determined, thereby causing generative model package 404 to produce model output 406 that may subsequently be used for further processing.

Generative model package 404 may be provided or otherwise used according to any of a variety of paradigms. For example, generative model package 404 may be used local to a computing device (e.g., computing device 102 in FIG. 1A) or may be accessed remotely from a machine learning service (e.g., MDE generator 108). In other examples, aspects of generative model package 404 are distributed across multiple computing devices. In some instances, generative model package 404 is accessible via an application programming interface (API), as may be provided by an operating system of the computing device and/or by the machine learning service, among other examples.

With reference now to the illustrated aspects of generative model package 404, generative model package 404 includes input tokenization 408, input embedding 410, model layers 412, output layer 414, and output decoding 416. In examples, input tokenization 408 processes input 402 to generate input embedding 410, which includes a sequence of symbol representations that corresponds to input 402. Accordingly, input embedding 410 is processed by model layers 412, output layer 414, and output decoding 416 to produce model output 406. An example architecture corresponding to generative model package 404 is depicted in FIG. 4B, which is discussed below in further detail. Even so, it will be appreciated that the architectures that are illustrated and described herein are not to be taken in a limiting sense and, in other examples, any of a variety of other architectures may be used.

FIG. 4B is a conceptual diagram that depicts an example architecture 450 of a pre-trained generative machine learning model that may be used according to aspects described herein. As noted above, any of a variety of alternative architectures and corresponding ML models may be used in other examples without departing from the aspects described herein.

As illustrated, architecture 450 processes input 402 to produce generative model output 406, aspects of which were discussed above with respect to FIG. 4A. Architecture 450 is depicted as a transformer model that includes encoder 452 and decoder 454. Encoder 452 processes input embedding 458 (aspects of which may be similar to input embedding 410 in FIG. 4A), which includes a sequence of symbol representations that corresponds to input 456. In examples, input 456 includes input and prompt for MDE generation 402 (e.g., corresponding to a skill of a skill chain).

Further, positional encoding 460 may introduce information about the relative and/or absolute position for tokens of input embedding 458. Similarly, output embedding 474 includes a sequence of symbol representations that correspond to output 472, while positional encoding 476 may similarly introduce information about the relative and/or absolute position for tokens of output embedding 474.

As illustrated, encoder 452 includes example layer 470. It will be appreciated that any number of such layers may be used, and that the depicted architecture is simplified for illustrative purposes. Example layer 470 includes two sub-layers: multi-head attention layer 462 and feed forward layer 466. In examples, a residual connection is included around each layer 462, 466, after which normalization layers 464 and 468, respectively, are included.

Decoder 454 includes example layer 490. Similar to encoder 452, any number of such layers may be used in other examples, and the depicted architecture of decoder 454 is simplified for illustrative purposes. As illustrated, example layer 490 includes three sub-layers: masked multi-head attention layer 478, multi-head attention layer 482, and feed forward layer 486. Aspects of multi-head attention layer 482 and feed forward layer 486 may be similar to those discussed above with respect to multi-head attention layer 462 and feed forward layer 466, respectively. Additionally, masked multi-head attention layer 478 performs multi-head attention over the output of encoder 452 (e.g., output 472). In examples, masked multi-head attention layer 478 prevents positions from attending to subsequent positions. Such masking, combined with offsetting the embeddings (e.g., by one position, as illustrated by multi-head attention layer 482), may ensure that a prediction for a given position depends on known output for one or more positions that are less than the given position. As illustrated, residual connections are also included around layers 478, 482, and 486, after which normalization layers 480, 484, and 488, respectively, are included.

Multi-head attention layers 462, 478, and 482 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 4B (e.g., by a corresponding normalization layer 464, 480, or 484).

Feed forward layers 466 and 486 may each be a fully connected feed-forward network, which applies to each position. In examples, feed forward layers 466 and 486 each include a plurality of linear transformations with a rectified linear unit activation in between. In examples, each linear transformation is the same across different positions, while different parameters may be used as compared to other linear transformations of the feed-forward network.

Additionally, aspects of linear transformation 492 may be similar to the linear transformations discussed above with respect to multi-head attention layers 462, 478, and 482, as well as feed forward layers 466 and 486. Softmax 494 may further convert the output of linear transformation 492 to predicted next-token probabilities, as indicated by output probabilities 496. It will be appreciated that the illustrated architecture is provided in as an example and, in other examples, any of a variety of other model architectures may be used in accordance with the disclosed aspects. In some instances, multiple iterations of processing are performed according to the above-described aspects (e.g., using generative model package 404 in FIG. 4A or encoder 452 and decoder 454 in FIG. 4B) to generate a series of output tokens (e.g., words), for example which are then combined to yield a complete sentence (and/or any of a variety of other content). It will be appreciated that other generative models may generate multiple output tokens in a single iteration and may thus use a reduced number of iterations or a single iteration.

Accordingly, output probabilities 496 may thus form MDE output 406 according to aspects described herein, such that the output of the generative ML model defines an MDE corresponding to a physical and/or virtual environment. For instance, MDE output 406 may be associated with a corresponding application and/or data format, such that MDE output is processed to display the MDE to a user and/or to fabricate a physical object, among other examples.

Figure 5:
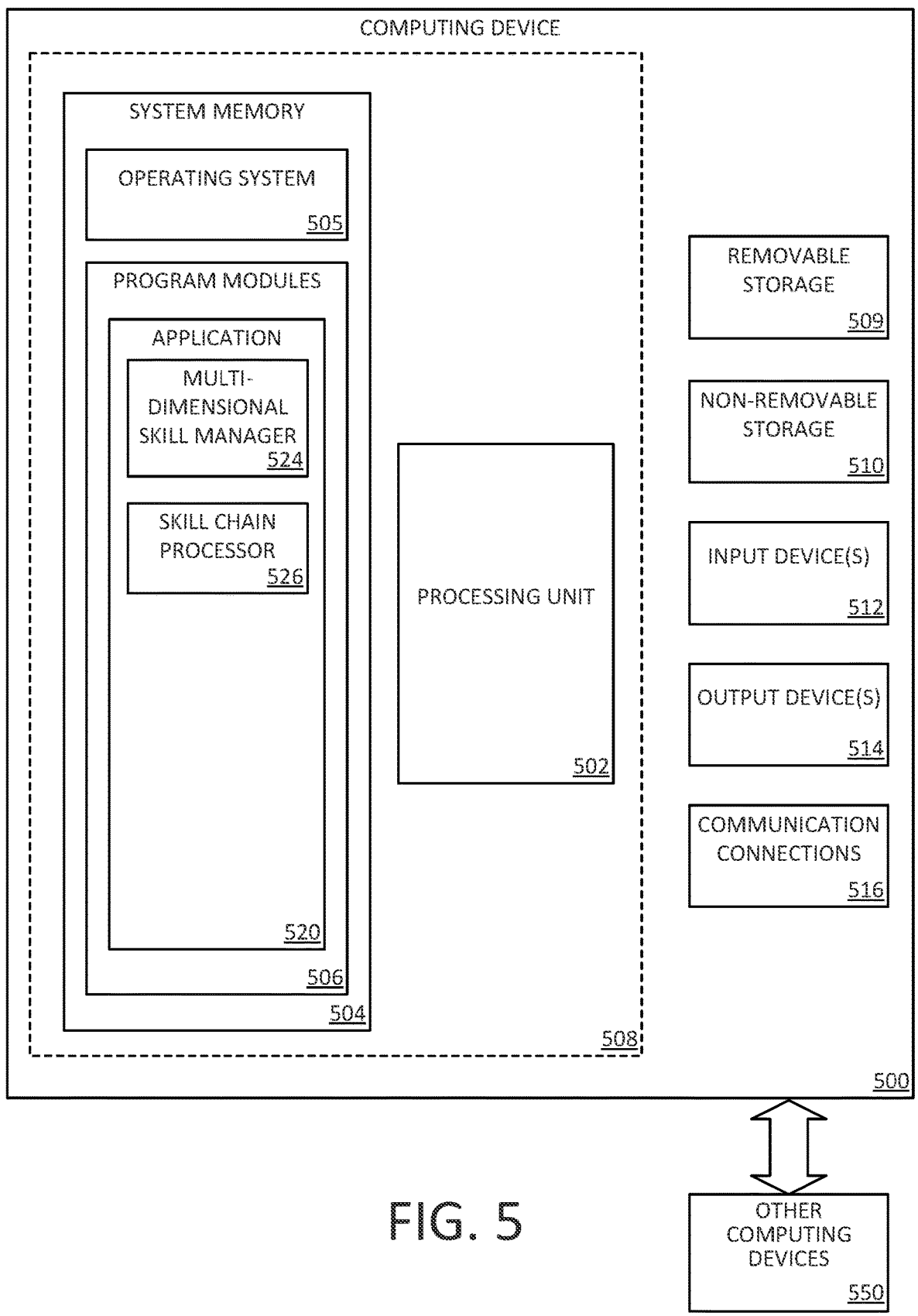
FIG. 5 illustrates a block diagram illustrating example physical components of a computing device with which aspects of the disclosure may be practiced.
Figure 6:
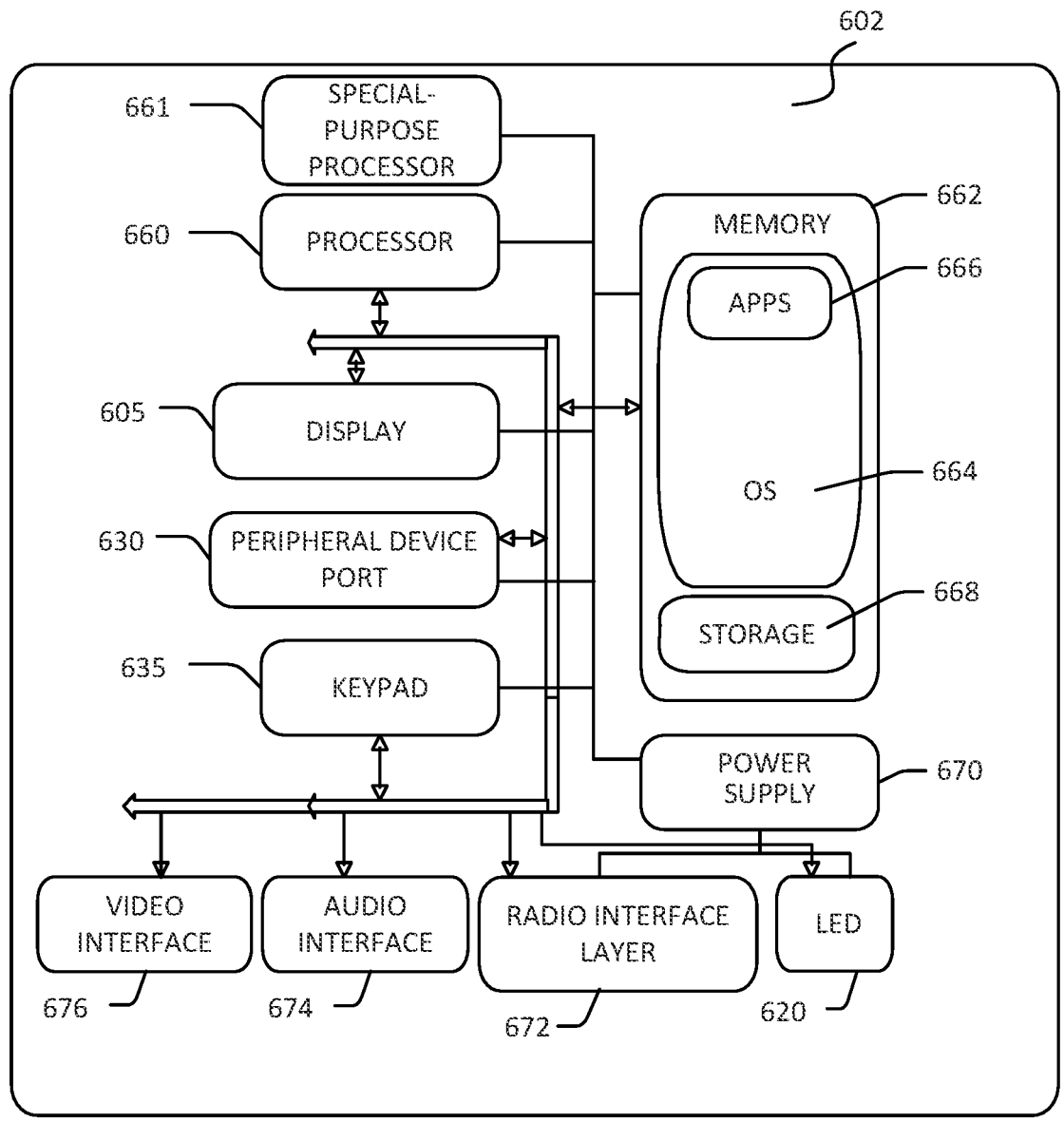
FIG. 6 illustrates a simplified block diagrams of a computing device with which aspects of the present disclosure may be practiced.
Figure 7:
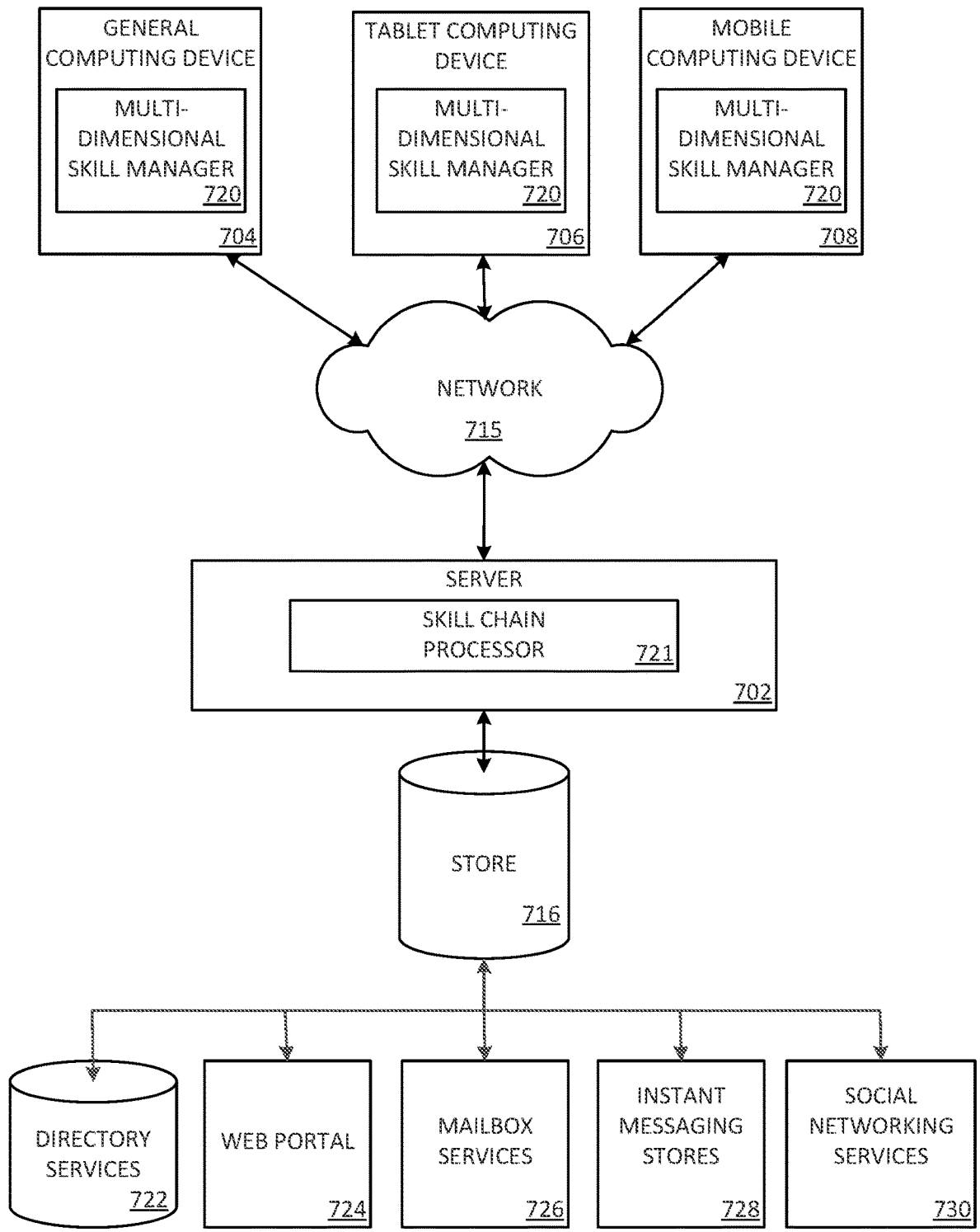
FIG. 7 is a simplified block diagram of a distributed computing system in which aspects of the present disclosure may be practiced.

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, described herein.

FIG. 5 is a block diagram illustrating physical components (e.g., hardware) of a computing device 500 with which aspects of the disclosure may be practiced. The computing device components described below may be suitable for the computing devices described above, including computing device 102 in FIG. 1A. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store multi-dimensional skill manager 524 and/or skill chain processor 526. The operating system 505, for example, may be suitable for controlling the operation of the computing device 500.

Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 6 is a block diagram illustrating the architecture of one aspect of a computing device. That is, the computing device can incorporate a system (e.g., an architecture) 602 to implement some aspects. In some examples, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., an embedding object memory insertion engine, an embedding object memory retrieval engine, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and/or special-purpose processor 661 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 602 may further include a video interface 676 that enables an operation of an on-board camera 630 to record still images, video stream, and the like.

A computing device implementing the system 602 may have additional features or functionality. For example, the computing device may also include additional data storage devices (removable and/or non-removable) such as, magnetic disks, optical disks, or tape. Such additional storage is illustrated in FIG. 6 by the non-volatile storage area 668.

Data/information generated or captured by the computing device and stored via the system 602 may be stored locally on the computing device, as described above, or the data may be stored on any number of storage media that may be accessed by the device via the radio interface layer 672 or via a wired connection between the computing device and a separate computing device associated with the computing device, for example, a server computer in a distributed computing network, such as the Internet. As should be appreciated such data/information may be accessed via the computing device via the radio interface layer 672 or via a distributed computing network. Similarly, such data/information may be readily transferred between computing devices for storage and use according to well-known data/information transfer and storage means, including electronic mail and collaborative data/information sharing systems.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 724, a web portal 725, a mailbox service 726, an instant messaging store 728, or a social networking site 730.

A multi-dimensional skill manager 720 (e.g., similar to the application 520) may be employed by a client that communicates with server device 702. Additionally, or alternatively, skill chain processor 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these examples of the computing devices may obtain content from the store 716, in addition to receiving graphical data useable to be either pre-processed at a graphic-originating system, or post-processed at a receiving computing system.

As will be understood from the foregoing disclosure, one aspect of the technology relates to a system comprising: at least one processor; and memory storing instructions that, when executed by the at least one processor, cause the system to perform a set of operations. The set of operations comprises: receiving, from a computing device, a natural language input that includes a description of a multi-dimensional entity; generating, using a machine learning model, multi-dimensional entity output responsive to the natural language input, wherein the multi-dimensional entity output defines a representation of the multi-dimensional entity; and providing, to the computing device the generated multi-dimensional entity output. In an example, generating the model output comprises: generating, based on the natural language input, a skill chain to generate the indicated multi-dimensional entity, wherein each skill of the skill chain is associated with at least a portion of the user input; for each skill in the skill chain: populating a prompt template corresponding to each skill; and processing, using a machine learning model, the prompt template for each skill to generate model output for the skill; and combining the model output for each skill of the skill chain to generate multi-dimensional entity output that is responsive to the natural language input. In another example, the natural language input includes a target output indication of at least one of a target application or a target data format for the multi-dimensional entity output. In a further example, a skill of the skill chain is associated with the target output indication, thereby generating the multi-dimensional entity output according to the target output indication. In yet another example, a first skill of the skill chain is associated with a first subpart of the multi-dimensional entity; and a second skill of the skill chain is associated with a second subpart of the multi-dimensional entity. In a further still example, a third skill of the skill chain processes model output of the first skill and model output of the second skill to generate the multi-dimensional entity output. In another example, the generated multi-dimensional entity output includes at least one of: instructions to render the multi-dimensional entity in a virtual environment; or instructions to fabricate a physical representation of the multi-dimensional entity.

In another aspect, the technology relates to a method. The method comprises: obtaining user input corresponding to a multi-dimensional entity, wherein the user input includes a target output indication; generating a request to generate multi-dimensional entity output using a machine learning model, wherein the request includes the target output indication; receiving, in response to the request, the multi-dimensional entity output; and generating, based on the multi-dimensional entity output, a display of the multi-dimensional entity. In an example, the user input corresponding to the multi-dimensional entity comprises an indication of the multi-dimensional entity in a first format; and the target output indication corresponds to a second format that is different than the first format. In another example, the request further comprises a representation of the multi-dimensional entity in the first format. In a further example, the target output indication indicates at least one of a target application or a target data format for the multi-dimensional entity output. In yet another example, the method further comprises processing the user input to generate a skill chain comprising one or more skills; and the request to generate the multi-dimensional entity comprises a request to process a skill of the generated skill chain. In a further still example, a skill of the skill chain is associated with the target output indication, thereby generating the multi-dimensional entity output according to the target output indication.

In a further aspect, the technology relates to another method. The method comprises: receiving, from a computing device, a natural language input that includes an indication of a multi-dimensional entity; generating, based on the natural language input, a skill chain to generate the indicated multi-dimensional entity, wherein each skill of the skill chain is associated with at least a portion of the user input; for each skill in the skill chain: populating a prompt template corresponding to each skill; processing, using a machine learning model, the prompt template for each skill to generate model output for the skill; combining the model output for each skill of the skill chain to generate multi-dimensional entity output that is responsive to the natural language input; and providing, to the computing device the generated multi-dimensional entity output. In an example, the natural language input includes a target output indication of at least one of a target application or a target data format for the multi-dimensional entity output. In another example, a skill of the skill chain is associated with the target output indication, thereby generating the multi-dimensional entity output according to the target output indication. In a further example, a first skill of the skill chain is associated with a first subpart of the multi-dimensional entity; and a second skill of the skill chain is associated with a second subpart of the multi-dimensional entity. In yet another example, a third skill of the skill chain processes model output of the first skill and model output of the second skill to generate the multi-dimensional entity output. In a further still example, the generated multi-dimensional entity output includes at least one of: instructions to render the multi-dimensional entity in a virtual environment; or instructions to fabricate a physical representation of the multi-dimensional entity. In another example, the natural language input comprises at least one of a speech input or text input obtained from a user of the computing device.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, cause the system to perform a set of operations, the set of operations comprising:
receiving, from a computing device, a natural language input that includes a description of a multi-dimensional entity;
generating, using a machine learning model, multi-dimensional entity output responsive to the natural language input, wherein the multi-dimensional entity output defines a representation of the multi-dimensional entity, the generating comprising:
populating, for each skill of a skill chain, a prompt template based on the received natural language input;
processing the respective populated prompt template for each skill to generate machine learning model output for each skill; and
combining the machine learning model output for each skill of the skill chain to generate the multi-dimensional entity output; and
providing, to the computing device, the generated multi-dimensional entity output.

2. The system of claim 1, wherein generating the model output comprises:
generating, based on the natural language input, the skill chain to generate the indicated multi-dimensional entity, wherein each skill of the skill chain is associated with at least a portion of the user input.

3. The system of claim 2, wherein the natural language input includes a target output indication of at least one of a target application or a target data format for the multi-dimensional entity output.

4. The system of claim 3, wherein a skill of the skill chain is associated with the target output indication, thereby generating the multi-dimensional entity output according to the target output indication.

5. The system of claim 2, wherein:
a first skill of the skill chain is associated with a first subpart of the multi-dimensional entity; and
a second skill of the skill chain is associated with a second subpart of the multi-dimensional entity.

6. The system of claim 5, wherein a third skill of the skill chain processes model output of the first skill and model output of the second skill to generate the multi-dimensional entity output.

7. The system of claim 1, wherein the generated multi-dimensional entity output includes at least one of:
instructions to render the multi-dimensional entity in a virtual environment; or
instructions to fabricate a physical representation of the multi-dimensional entity.

8. A computer-implemented method, comprising:
obtaining user input corresponding to a multi-dimensional entity, wherein the user input includes a target output indication;
generating a skill chain to generate the multi-dimensional entity output using a machine learning model based on the target output indication, the generating comprising
generating a prompt based at least in part on the received natural language input, thereby causing the machine learning model to generate the skill chain based on the prompt;
for each skill in the skill chain:
populating a prompt template corresponding to the skill; and
processing, using a machine learning model, the populated prompt template to generate model output for the skill;
combining the model output for each skill of the skill chain to generate the multi-dimensional entity output; and
generating, based on the multi-dimensional entity output, a display of the multi-dimensional entity.

9. The computer-implemented method of claim 8, wherein:
the user input corresponding to the multi-dimensional entity comprises an indication of the multi-dimensional entity in a first format; and
the target output indication corresponds to a second format that is different than the first format.

10. The computer-implemented method of claim 9, wherein the prompt further comprises an indication of the first format.

11. The computer-implemented method of claim 8, wherein the target output indication indicates at least one of a target application or a target data format for the multi-dimensional entity output.

12. The computer-implemented method of claim 8, wherein each skill of the skill chain is associated with at least a portion of the user input.

13. The computer-implemented method of claim 8, wherein a skill of the skill chain is associated with the target output indication, thereby generating the multi-dimensional entity output according to the target output indication.

14. A computer-implemented method, comprising:
receiving, from a computing device, a natural language input that includes an indication of a multi-dimensional entity;
generating, based on the natural language input, a skill chain to generate the indicated multi-dimensional entity, wherein each skill of the skill chain is associated with at least a portion of the user input;
for each skill in the skill chain:
populating a prompt template corresponding to each skill;
processing, using a machine learning model, the prompt template for each skill to generate model output for the skill;
combining the model output for each skill of the skill chain to generate multi-dimensional entity output that is responsive to the natural language input; and
providing, to the computing device, the generated multi-dimensional entity output.

15. The computer-implemented method of claim 14, wherein the natural language input includes a target output indication of at least one of a target application or a target data format for the multi-dimensional entity output.

16. The computer-implemented method of claim 15, wherein a skill of the skill chain is associated with the target output indication, thereby generating the multi-dimensional entity output according to the target output indication.

17. The computer-implemented method of claim 14, wherein:
a first skill of the skill chain is associated with a first subpart of the multi-dimensional entity; and a second skill of the skill chain is associated with a second subpart of the multi-dimensional entity.

18. The computer-implemented method of claim 17, wherein a third skill of the skill chain processes model output of the first skill and model output of the second skill to generate the multi-dimensional entity output.

19. The computer-implemented method of claim 14, wherein the generated multi-dimensional entity output includes at least one of:
  instructions to render the multi-dimensional entity in a virtual environment; or
  instructions to fabricate a physical representation of the multi-dimensional entity.

20. The computer-implemented method of claim 14, wherein the natural language input comprises at least one of a speech input or text input obtained from a user of the computing device.

* * * * *